July 6, 1926.  1,591,414
L. BRENNEIS
AGRICULTURAL IMPLEMENT WITH DETACHABLE WORKING MEMBER
Filed Nov. 3, 1924  Sheets-Sheet 2
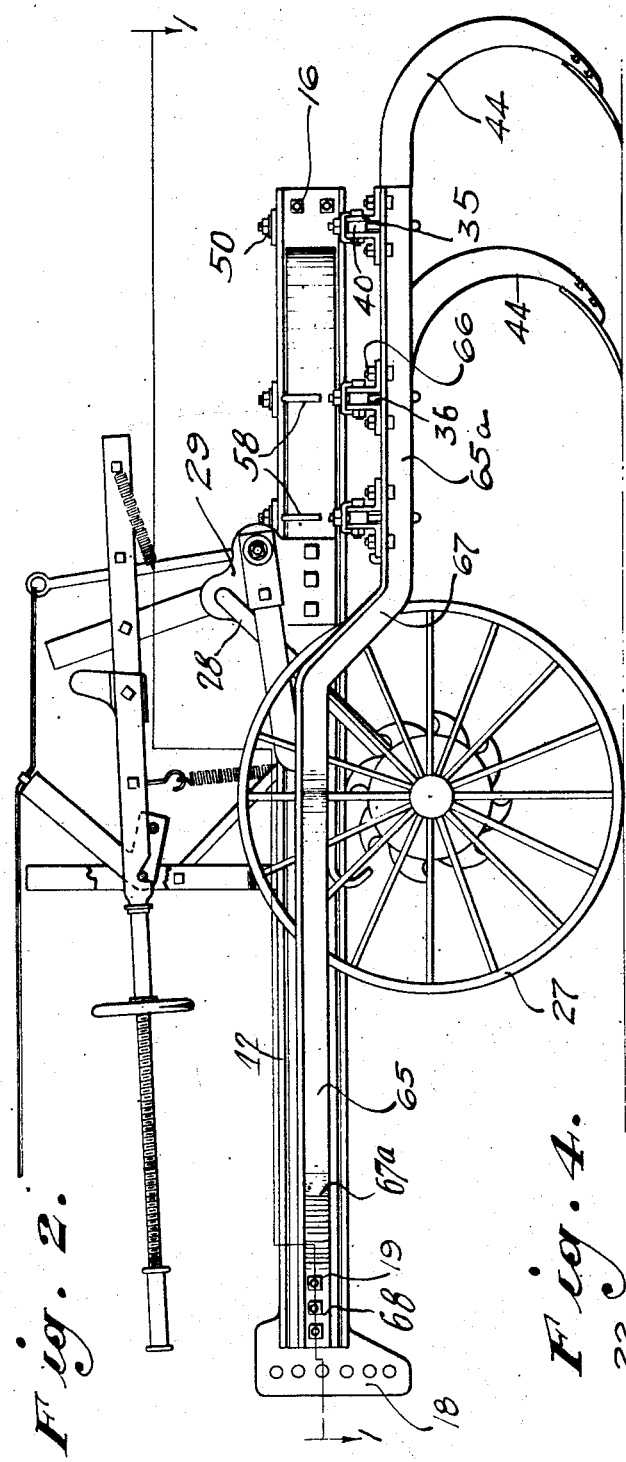
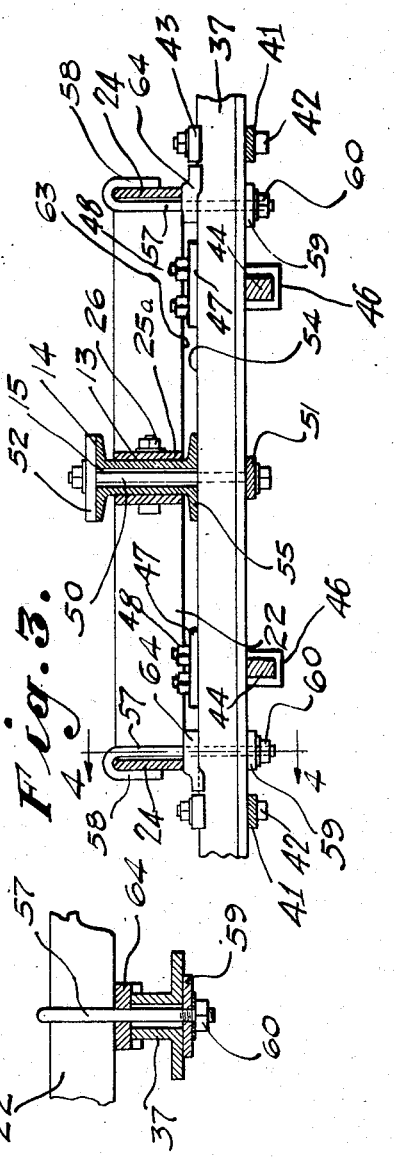
INVENTOR:
LOUIS BRENNEIS,
BY
ATTORNEY Patented July 6, 1926.

1,591,414

UNITED STATES PATENT OFFICE.

LOUIS BRENNEIS, OF OXNARD, CALIFORNIA, ASSIGNOR TO BRENNEIS MANUFACTURING COMPANY, OF OXNARD, CALIFORNIA, A CORPORATION OF CALIFORNIA.

AGRICULTURAL IMPLEMENT WITH DETACHABLE WORKING MEMBER.

Application filed November 3, 1924. Serial No. 747,565.

This invention relates to agriculture, and it particularly concerns implements and vehicles employed in this art.

Various implements, such as sub-soil plow, chisel cultivator and other agricultural vehicles, possess the same characteristics except that the working elements thereof are dissimilar. In other words, all these implements are constructed in such a manner that the working member thereof may be elevated out of engagement with the ground so that roads and areas not to be worked may be passed over.

It is an object of this invention to provide a farm vehicle having a detachable working member. This construction allows the removal of the complete working member and a replacing of another working member. A vehicle of this character may be provided with a number of different types of working elements which may be selectively employed thereon.

It is another object of this invention to provide in a farm vehicle of this character a novel form of bracing members which incurs rigidity in the working member, and is productive in preventing any twisting action or distortion whatever in the working member relative to the frame structure of the vehicle.

It is also an object of this invention to provide a vehicle of this character having a working member which may be readily removed, there being few attachments conveniently accessible but situated for the obtaining of a maximum of rigidity in the working member.

Other objects and advantages of the invention will be made evident hereinafter.

Referring to the drawings which are for illustrative purposes only,

Fig. 2 is a side elevational view of the vehicle shown in Fig. 1.

Fig. 3 is a fragmentary sectional view taken as indicated by the line 3—3 of Fig. 1, this view clearly showing, on an enlarged scale, the manner in which the detachable working element may be detachably secured to the frame construction of the vehicle.

Fig. 4 is a view taken as indicated by the line 4—4 of Fig. 3.

Figure 1:
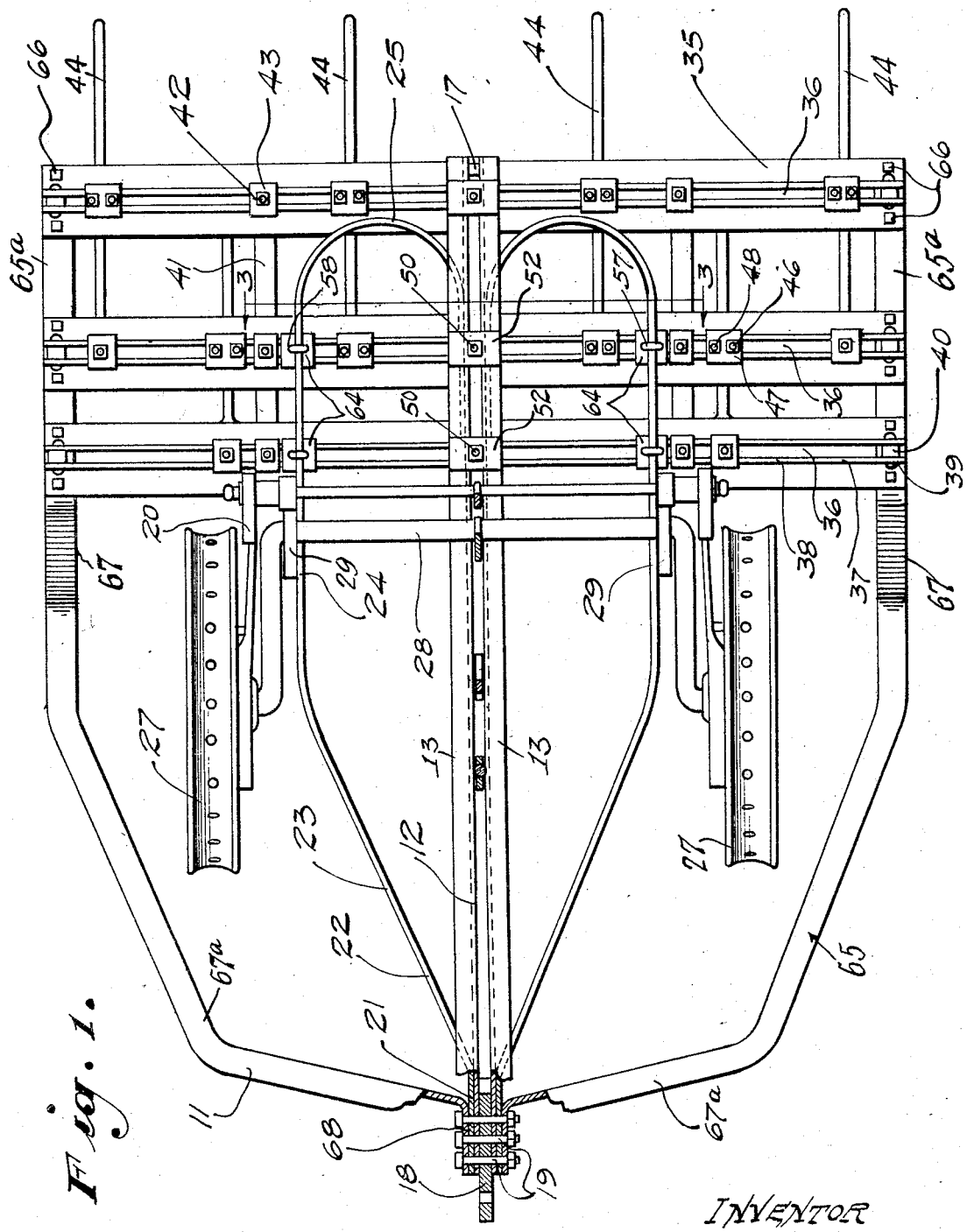
Fig. 1 is a partially sectioned view of a vehicle embodying the features of my invention, this view being taken substantially as indicated by the line 1—1 of Fig. 2.

In the drawings I show a wheeled main frame 11 which may consist of a central structure 12. As clearly shown in Fig. 3, the central structure 12 provides channels 13 which are arranged so that the legs 14 thereof extend in opposite directions. The channels 13 are secured together, as shown in Figs. 1 and 2, at the rear end thereof by means of bolts 16 having spacers 17 which are placed between the webs of the channels 13 and thereby provide a space 15 therebetween. The extreme forward end of the channels 13 are spaced apart by means of a draw member 18 and are secured together by bolts 19, the draw member 18 being arranged for attachment to a suitable drive vehicle, not shown. The extreme forward ends 21 of side bars 22 are secured against the webs of the channels 13 by the bolts 19. The side bars 22 are extended outwardly at 23 and extend parallel to the central structure at 24. The bars 22 are curved at 25 so that the ends 25$^a$, as shown in Figs. 1 and 3, extend inwardly against the web portions of the channels 13 and are directed forwardly, the ends 25$^a$ being secured to the central structure by bolts 26. The frame is rendered movable by wheels 27 situated outside the side bars 24, these wheels being secured on the ends of an axle 28 and this axle 28 being in turn secured to the frame by means of brackets 29.

In the drawings I show the vehicle equipped with a power lift for elevating and lowering the frame relatively to the ground for moving the working member from, and into working position. This power lift does not constitute a part of the invention and a description thereof is unnecessary herein. The power lift shown is identical with that presented to the Patent Office in my application entitled Power lift for agricultural implements and vehicles, filed March 10, 1924, Serial No. 698,059, to which reference may be had, if desired.

In the drawings I have shown the working member having the characteristics of a chiseled cultivator. It should be understood, however, that the working member shown is solely for illustration, and I wish to limit myself thereto in no manner. The working member comprises a mounting frame 35. This mounting frame consists of a series of channels 36. Each of these channels 36 is in the form of a pair of angle irons 37 which are arranged so that the adjacent legs 38 thereof are parallel to each other. The angle irons 37 are secured together by means of rivets 39, there being spacers 40 between the legs 38 so as to provide the channel opening 36 therebetween. The channel constructions 36 are retained in fixed relationship by means of bars 41 which engage with the lower face of the angle irons 37, and are clamped thereagainst by means of bolts 42 which extend through plates 43 which bear against the upper edges of the pairs of angle bars 37, as shown. Secured to the mounting frame 35 are chisel cultivator elements 44. The elements 44 are transversely and adjustably secured to the mounting frame 35 by means of U-bolts 46 which extend around the lower face of the elements 44 and extend through the channel 36. Plates 47 are placed on the upper edges of the legs 38 and serve as bearing plates for the nuts 48 of the U-bolts 46.

Means for detachably securing a working element, which comprises the mounting frame and elements 44 to the main frame of the vehicle, is clearly shown in Figs. 3 and 4. A central attachment is provided in the form of bolts 50, each bolt 50 extending through the channels 36 and the space 15 between the channel members 13 of the central structure 12. A bar 51 extends along the lower faces of the angle irons 37 through which bar 51 the bolts 50 extend. The upper ends of the bolts 50 project through plates 52. When the bolts 50 are tightened, the upper faces 54 of the angle irons 37 are clamped securely against the lower faces 55 of the channels 13. Intermediate securing means are provided in the form of hook-bolts 57, the ends 58 of these bolts extending over the upper faces of the side bars 24. The bolt portions of these hook-bolts 57 extend downwardly through the channels 36, through plates 59, and have nuts 60 provided on the lower end thereof. To compensate for the difference in planes of the lower faces 55 of the channels 13, and the lower faces 63 of the bars 24, I provide bearing plates 64. The construction shown, when the nut 60 is tightened, securely clamps the mounting frame to the side bars 24 at these points.

Bracing members in the form of angle irons 65, which constitute an important part of the construction, extend below and engage with the lower faces of the angle irons 37 at the rearward end 65a thereof. The portions 65a are permanently secured to the extreme outer ends of the angle irons 37 by means of bolts 66. The brace members are bent upwardly at 67 so as to extend in the same plane as the central structure of the main vehicle frame. The braces are extended inwardly at 67a and have forwardly extending end portions 68 which engage with the outer faces of the forward ends 21 of the side bars 24, and which are secured to the frame by means of the bolts 19 which extend through the portion 68 of the brace portions 21 of the side bars, the web of the channels 13, and the draw member 18. It will be seen from Fig. 1 that the brace members are detachable from the main frame by the removal of the bolts 19.

When it is desired to replace the working member, shown in the drawings, for an alternative working member, the bolts 19 are removed so as to detach the forward end 68 of the brace members. The hook-bolts 57 are removed and the central bolts 50 are then removed which completes the detaching of the working member from the main frame. It will be seen that the attachment means are conveniently accessible and the working member may be readily removed.

From the standpoint of economy, it will be seen that the same vehicle construction may be used in the capacity of a number of different implements by merely substituting one working member for another. From a standpoint of durability, it will be seen that the working member is secured to the main frame of the vehicle in five places. By extending the braces to the front of the vehicle, a maximum of opposition to twisting and distortion is provided.

I claim as my invention:

1. In an agricultural implement of the class described: a longitudinal draft frame comprising a pair of spaced beams forming a vertical slot centrally disposed; a draft head provided at the front end of said frame; a tool holding frame comprising a pair of angle irons spaced to form a vertical slot; a bolt passing through said slots to secure said tool holding frame to the rear end of said draft frame; wheels mounted upon said draft frame astraddle the middle portion thereof for supporting said draft frame; and auxiliary draft members disposed outside of said wheels rigidly secured to the outer portions of said tool holding frame and detachably secured to the front end of said draft frame.

2. An agricultural implement of the class described, comprising: a centrally disposed main draft member comprising a pair of spaced beams forming a vertical slot; a tool holding frame comprising tool holding members, each of which is formed by a pair of angle irons spaced to form a vertical slot; bolts, each of which passes through the slot in said draft frame and through the slot in one of said tool holding members so as to secure said tool holding frame to said main draft member transversely disposed relative to said main draft member; spacing members secured to said tool holding members; and auxiliary draft members provided by the forward extension of a pair of spacing members secured upon opposite end portions of said tool holding members, said auxiliary draft members being detachably secured to the forward portion of the aforesaid main draft member.

In testimony whereof, I have hereunto set my hand at Los Angeles, California, this 29th day of October 1924.

LOUIS BRENNEIS.